March 10, 1959   W. A. RAY   2,876,535
METHOD OF MAKING PACKING SEAL FOR DIE-CAST INSERT
Filed Feb. 15, 1954
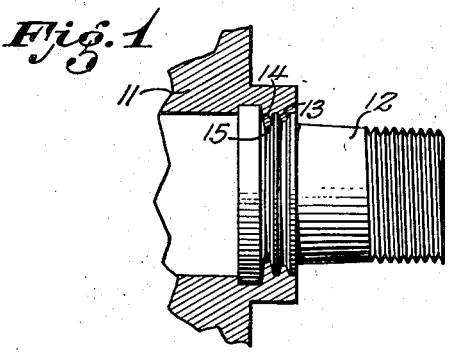
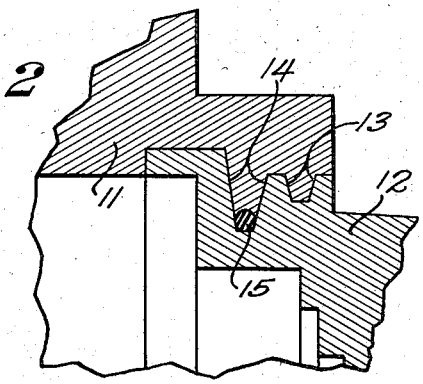
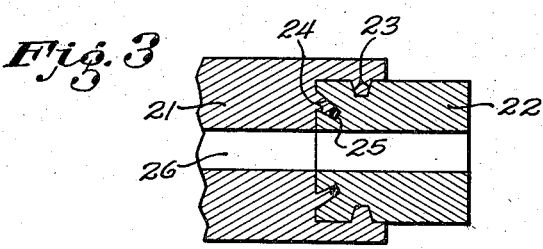
INVENTOR,
WILLIAM A. RAY
BY
John H. Rouse,
ATTORNEY.

2,876,535

METHOD OF MAKING PACKING SEAL FOR DIE-CAST INSERT

William A. Ray, North Hollywood, Calif., assignor to General Controls Co., Glendale, Calif., a corporation of California Application February 15, 1954, Serial No. 410,248

4 Claims. (Cl. 29—527)

My present invention relates to the method of making fluid-pressure seals, and more particularly to a method of sealing the junction between a metallic fitting or insert and a body die-cast around it.

While the junction between the insert and the body produced according to conventional die-casting practice is normally a tight one from a mechanical standpoint, nevertheless there is the possibility of leakage at the junction when the same is subject to fluid pressure under conditions of vibration and temperature variation for an extended period of time.

It is therefore a main object of this invention to provide a method that will ensure a fluid-tight seal between the insert and the die-cast body. I accomplish this object by providing a layer of elastic organic material, such as synthetic rubber, in the root of a groove formed in a surface of the insert which defines the junction subject to the fluid pressure. I have found that when this groove is relatively deep, and the insert is of metal having good thermal conductivity, ordinary synthetic rubber is not materially affected by the heat of the molten metal flowing into the groove.

For full understanding of the invention, and further appreciation of its objects and advantages, reference is to be had to the following detailed description and accompanying drawing, and to the appended claims.

In the drawing:

Figure 1 is a fragmentary view of a die-cast control-device body and insert, partly in section and partly in elevation, showing a sealing arrangement embodying this invention;

Figure 2 is an enlarged view, in section, of a portion of the structure of Fig. 1; and Figure 3 is a fragmentary sectional view showing a modified sealing arrangement according to the invention.

Referring first more particularly to Figs. 1 and 2 of the drawing, the numeral 11 indicates a portion of a hollow body, such as that of a thermostatic valve structure, which has been die-cast around a hollow fitting 12 having a threaded outer end for attachment to apparatus such as the storage tank of an automatic water heater.

As is better seen in Fig. 2, the fitting or insert 12 has a circumferential groove 13 of the kind usually provided for strengthening the junction between the insert and the die-cast body, and an additional circumferential groove 14 which is considerably deeper than groove 13. In the root or innermost region of groove 14 is an annular packing member or O-ring 15 of elastic material such as synthetic rubber.

The ring 15 was, of course, placed in groove 14 prior to the die-casting operation, and is of a size to fit snugly in the root of the groove before it is forced into still tighter engagement with the walls of the groove by the pressure of the molten metal. Because of the elastic nature of the ring, and the compressed condition in which it remains after the structure has cooled, the ring forms an effective fluid-tight seal for the junction between the body and the insert.

When an actual embodiment of this invention, wherein the groove 14 and ring 15 were of the same relative dimensions as shown in Figs. 1 and 2, was cut so as to expose the O-ring, the same appeared to be virtually unaffected by the heat to which it has been subjected in the die-casting operation. This is probably because of partial cooling of the molten metal by its contact with the side walls of groove 14.

In this actual embodiment the ring 15 was of ordinary polymerized butadiene or buna rubber, the fitting 12 was of red cast brass containing about 85% copper, and the body-metal an ordinary die-casting alloy containing about 95% aluminum and having a working temperature of 1100°–1200° F.

The modified form of the invention in Fig. 3 of the drawing illustrates another manner in which the packing member may be applied. In this figure the numeral 21 indicates a body die-cast around a tubular fitting 22 having the customary strengthening groove 23. This fitting has in its flat inner-end surface a circular groove 24 in the root of which a synthetic-rubber O-ring 25 is disposed. The side walls of groove 24 are preferably inclined toward the axis of the fitting, as shown, so that the ring is initially maintained in the root of the groove by its own resilience. Since groove 24 is in a surface of the fitting which defines the junction between it and body 21 subject to pressure of fluid in the body-opening 26, leakage of the fluid past the fitting is prevented by the ring.

The specific embodiments of my invention as shown and described herein are obviously susceptible of modification without departing from the spirit of the invention, and I intend therefore to be limited only by the scope of the appended claims.

I claim as my invention:

1. The method of sealing the junction between a metallic fitting and a hollow metallic body of aluminum-base alloy with a working temperature of 1100°–1200° F. to be die-cast therearound, which comprises: forming a deep narrow continuous groove in a surface of said fitting adapted to define the part of said junction subject to pressure of fluid in the hollow of said body; providing only in the root or innermost region of said groove, where it will not be subjected to the full heat of said alloy to be die-cast around the fitting, a continuous layer of elastic and impermeable organic material that would be materially damaged by heat in excess of 500° F.; and then die-casting said alloy around, and in intimate contact with, said surface and said organic material to form said body.

2. The method according to claim 1 wherein the sides of said groove are tapered so that the groove is narrower at its root.

3. The method of sealing the junction between a metallic fitting and a hollow metallic body of aluminum-base alloy with a working temperature of 1100°–1200° F. to be die-cast therearound, which comprises: forming a deep narrow continuous groove in a surface of said fitting adapted to define the part of said junction subject to pressure of fluid in the hollow of said body; providing only in the root or innermost region of said groove, where it will not be subjected to the full heat of said alloy to be die-cast around the fitting, an O-ring of synthetic rubber that would be materially damaged by heat in excess of 500° F.; and then die-casting said alloy around, and in intimate contact with, said surface and said O-ring to form said body.

4. The method according to claim 3 wherein the sides of said groove are tapered so that the groove is narrower at its root, and the cross sectional diameter of said O-ring is such that the O-ring is in engagement with the sides of the groove at the root thereof.

References Cited in the file of this patent

UNITED STATES PATENTS

| | | |
|---|---|---|
| 655,033 | Vanderman | July 31, 1900 |
| 2,321,731 | Bouton | June 15, 1943 |
| 2,387,013 | Fuller | Oct. 16, 1945 |
| 2,477,676 | Woodling | Aug. 2, 1949 |